United States Patent
Lin

(10) Patent No.: US 7,796,622 B2
(45) Date of Patent: Sep. 14, 2010

(54) METHOD AND APPARATUS FOR IMPLEMENTING MEDIA GATEWAY INTERNAL CONNECTION

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 12/207,156

(22) Filed: Sep. 9, 2008

(65) Prior Publication Data

US 2009/0003365 A1  Jan. 1, 2009

Related U.S. Application Data

(63) Continuation of application No. PCT/CN2007/000064, filed on Jan. 8, 2007.

(30) Foreign Application Priority Data

Mar. 9, 2006  (CN) .................. 2006 1 0024559

(51) Int. Cl.
*H04L 12/28* (2006.01)
*H04L 12/56* (2006.01)
*H04L 1/00* (2006.01)
*H04L 12/26* (2006.01)

(52) U.S. Cl. .................. 370/401; 370/230; 370/395.2

(58) Field of Classification Search .......... 370/401, 370/230, 395.2

See application file for complete search history.

(56) References Cited

U.S. PATENT DOCUMENTS

| 2003/0031137 | A1 | 2/2003 | Mecklin Tomas |
| 2005/0076117 | A1 | 4/2005 | Hou et al. |
| 2007/0116018 | A1 * | 5/2007 | Doleh et al. .............. 370/401 |

FOREIGN PATENT DOCUMENTS

| CN | 1553668 A | 12/2004 |
| CN | 1612564 A | 5/2005 |
| WO | 01/67683 A1 | 9/2001 |
| WO | 2005/034369 A2 | 4/2005 |
| WO | 2006/048769 A1 | 5/2006 |
| WO | WO 2006/048769 | * 5/2006 |

OTHER PUBLICATIONS

Groves, et al.; "The Megaco/H.248 Gateway Control Protocol, Version 2"; Apr. 2003; Sections 6.2.4, 7.1.7, 7.1.12, 7.2.5.

(Continued)

*Primary Examiner*—Ronald Abelson

(57) ABSTRACT

A method and apparatus to implement media gateway internal connection. The MGC obtains the MG's capability of supporting an internal connection via audit or configuration. Based on the obtained capability, the MGC determines and controls the implementation of the internal connection, or the MG determines and controls the implementation of the internal connection itself. If the MG determines and controls the implementation of the internal connection itself, the MG informs the MGC to modify the call mode in the MGC into the same as in the MG, or maps between the respective operations for the MGC and the MG to their respective call models after the MG implements the internal connection. The MGC can also control the MG's capability of determining and realizing the internal connection by itself based on the service characteristics.

15 Claims, 3 Drawing Sheets

OTHER PUBLICATIONS

International Search Report for International Application No. PCT/CN2007/000064, dated Apr. 26, 2007, with English translation thereof.

Avaya Inc.: "Maintenance for the Avaya G250 and Avaya G350 Media Gateways" [Online]; Feb. 2006; pp. 1-320; XP002527211; Retrieved from the Internet: URL:http://support.avaya.com/elmodocs2/comm_mgr/r3_1/pdfs/03_300438_2.pdf>, [retrieved on May 8, 2009].

European Search Report for European Application No. 07701996.6, dated May 22, 2009.

Andreasen, F., et al.; "Media Gateway Control Protocol (MGCP), Version 1.0"; Network Working Group; Request for Comments: 3435; Jan. 2003; pp. 1-157.

"Gateway Control Protocol: Version 3"; International Telecommunication Union; ITU-T Telecommunication of Standardization Sector of ITU; Series H: Audiovisual and Multimedia Systems; Infrastructure of audiovisual services—Communication Procedures; ITU-T Recommendation H.248.1; Sep. 2005.

\* cited by examiner

METHOD AND APPARATUS FOR IMPLEMENTING MEDIA GATEWAY INTERNAL CONNECTION

CROSS-REFERENCE TO RELATED APPLICATIONS

This application is a continuation of International Application No. PCT/CN2007/000064, filed Jan. 8, 2007. This application claims the benefit and priority of Chinese Application No. 200610024559.3, filed Mar. 9, 2006. The entire disclosures of each of the above applications are incorporated herein by reference.

FIELD

The present disclosure relates to media gateway and media gateway control technologies that enable separation between bearer and control in the field of communication technologies and to a method and apparatus for implementing an internal connection at a media gateway.

BACKGROUND

This section provides background information related to the present disclosure which is not necessarily prior art.

The definition of the Next Generation Network (NGN) always changes with the development of the NGN. In the "2004 Global NGN Peak Forum" hold by the International Telecommunication Union (ITU), the standard of the NGN is defined as a packet based network, which can offer various services including telecommunication services and utilize transport technologies that support different bandwidths and Quality of Service (QoS) guarantee. The final direction and extent of the development of the NGN is thus determined.

In view of the current deployment of the NGN, two critical components, a Media Gateway Controller (MGC) and a Media Gateway (MG), are generally utilized for networking. The MGC is responsible for a call control function, and the MG is responsible for a service bearer function, thereby realizing separation of the call control plane and the service bearer plane. The above two components can evolve separately, so that it is possible to share network resources fully, simplify equipment upgrade and service expansion, and lower the cost of development and maintenance greatly.

The media gateway control protocol is the main protocol for communication between an MGC and an MG. At present, the widely-used protocols include the Gateway Control Protocol/H.248 (H.248/MeGaCo) and the Media Gateway Control Protocol (MGCP), and the communication protocol among MGs is the RealTime Transfer Protocol (RTP), as shown in FIG. 1.

The MGCP is established by the Internet Engineering Task Force (IETF) in October, 1999 and revised in January, 2003. Version 1 of the H.248/MeGaCo protocol is established jointly by the IETF and the ITU in November, 2000, and version 3 of the H.248/MeGaCo protocol is released by the ITU in September, 2005.

Eight basic commands, Add, Modify, Subtract, Move, AuditValue, AuditCapabilities, Notify and ServiceChange, are provided by the H.248/MeGaCo protocol between the MGC and the MG.

Nine basic commands, NotificationRequest (RQNT), Notify (NTFY), CreateConnection (CRCX), ModifyConnection (MDCX), DeleteConnection (DLCX), AuditEndpoint (AUEP), AuditConnection (AUCX), ReStartinProgress (RSIP) and EndpointConfiguraton (EPCF), are provided by the MGCP between the MGC and the MG.

The H.248/MeGaCo protocol is developed from the MGCP. Taking the H.248 for example, an MG bears services by means of the resources thereon. Those resources can be abstractly expressed as terminations, including physical terminations and temporary terminations. The physical termination is a physical entity of semi-permanent existence, such as a Time Division Multiplexing (TDM) channel. The temporary termination is a public resource that is temporarily obtained upon request and released after having been used, such as an RTP stream. The combination of terminations is abstractly expressed as a context. A context may include multiple terminations. The relationship among terminations is usually expressed as a topology. A termination that has not been associated with other terminations is included by a special context called Null context.

In such an abstract model of protocol, connection of a call lie actually in operations of terminations and contexts, and the operations are accomplished by command requests and replies between the MGC and the MG. Command parameters, also called descriptors, are classified into property, signal, event and statistic.

In particular, property represents the specification of resource requirements, usually sent to the MG by the MGC or set by the MG itself, such as a maximum or minimum value set for a jitter buffer; signal is used by the MGC to instruct the MG to operate the resources, such as play a dial tone, a ring back tone or a busy tone to a user; event is used by the MGC to instruct the MG to monitor status, such as monitor off-hook, hang-up, dialing and flash-hook performed by a user; and statistic represents the information of resource usage. These statistic parameters are usually calculated by the MG, and some of them can be enabled or disabled, i.e., activated or deactivated, selectively by the MGC. Certain parameters with a service correlation are aggregated logically into a package.

At present, a typical abstract logic model for an Internet Protocol (IP) voice call is that, two parties of the call, i.e., a calling party and a called party, each has a context containing two terminations, and the two parties of the call is present at different MGs. In particular, for an Access Media Gateway (AMG), an Integrated Access Device (IAD) or a Trunk Media Gateway (TMG), the two terminations may be a physical termination and a temporary termination respectively, i.e., connected to a circuit network and a packet network. For a Border Media Gateway (BMG) or a Packet Media Gateway (PMG), the two terminations may be two temporary terminations, i.e., connected to different packet networks. Each of the terminations described above represents a transmission type or media codec type, such as TDM, RTP, and Adaptive Multi-Rate (AMR). Therefore, system resources, such as a Digital Signal Processor (DSP), are also required for the codec conversion between any two terminations.

If the two parties of a call are present at the same MG, such a call may be treated as an internal connection, and no conversion between two codec formats may be required practically. For example, two subscribers for the Plain Old Telephone Service (POTS) at one AMG may make a call without a transfer of (POST1-IP1)-(IP2-POST2), and without a codec conversion, i.e., TDM-RTP, performed by a DSP. In other words, one context containing two physical terminations rather than two contexts each containing one physical termination and one temporary termination may be utilized. Additionally, two media streams at one PMG may also interwork without a transfer of (IP1-IP1)-(IP2'-IP2), and without a codec conversion, i.e., RTP1-RTP2, performed by a DSP. In other words, one context containing two temporary terminations rather than two contexts each containing two temporary terminations may be utilized. As a result of the reduction of the codec conversion, the expensive resources, such as a DSP, may be saved and the QoS of media transmissions may be further guaranteed.

In such a case in which an internal connection may be created, currently, there are two implementation modes for making determination and performing control. One is a controlled mode, in which the MGC determines two parties of a call are present at the same MG, and instructs the MG to add two terminations representing respectively the two parties into one context. The other is an autonomous mode, in which the MGC instructs the MG to create one context for each party of the call without determining whether the two parties of the call are present at the same MG, while the MG determines by itself the two contexts are present at the same MG, and connects the two terminations representing the two parties of the call directly.

In practice applications, the above two modes exist concurrently. However, because there is no standardized means for determining and controlling an internal connection, the MGC and the MG do not know how to deal with the scenarios that are needed to be supported. For example, the scenarios may be that, the MGC supports the determining and controlling of an internal connection, and the MG can also create an internal connection as instructed by the MGC; the MGC supports the determining and controlling of an internal connection, while the MG does not support the creating of an internal connection (for example, there is no internal logic for connecting two TDM channels); the MGC does not determine and control an internal connection, while the MG determines and controls an internal connection by itself; and the MG can determine and control an internal connection by itself, but the creating of an internal connection by the MG itself needs to be disabled when the MGC is implementing a service (such as a loop-back test). This becomes especially severe if the MGC and the MG are supplied from different equipment vendors.

SUMMARY

This section provides a general summary of the disclosure, and is not a comprehensive disclosure of its full scope or all of its features.

Embodiments provides a method and apparatus for implementing an internal connection at a media gateway, so that a media gateway controller and a media gateway with different connection capabilities may cooperate well, to benefit from the internal connection to a greatest extent.

A method for implementing an internal connection at a media gateway according to an embodiment includes the steps of:

acquiring, by a media gateway controller, information on the capability of a media gateway for supporting an internal connection; and performing, by the media gateway controller, corresponding control according to the capability of the media gateway for supporting an internal connection, wherein the internal connection is a direct connection between two parties of a call at the same media gateway.

The capability of the media gateway for supporting an internal connection includes:

supporting that an internal connection is determined and controlled by the media gateway controller;

supporting that an internal connection is determined and controlled by the media gateway itself; and not supporting an internal connection.

In various embodiments, corresponding control according to the capability of the media gateway for supporting an internal connection includes:

when the internal connection is to be determined and controlled by the media gateway controller, and the media gateway controller determines that the two parties of the call need to be connected internally, instructing, by the media gateway controller, the media gateway to add two terminations representing respectively the two parties of the call into a same context, so that the two terminations are connected with each other directly; and when the internal connection is to be determined and controlled by the media gateway itself, instructing, by the media gateway controller, the media gateway to create one context for each party of the call, and add a termination representing the calling party into the context created for the calling party, and add a termination representing the called party into the context created for the called party; and when determining the two parties of the call need to be connected internally, connecting, by the media gateway, the two terminations representing respectively the two parties of the call with each other.

In various embodiments, the media gateway controller acquires the information on the capability of the media gateway for supporting an internal connection by auditing the media gateway.

In various embodiments, the media gateway controller acquires the information on the capability of the media gateway for supporting an internal connection through configuration.

A media gateway supporting an internal connection is provided in another embodiment. The media gateway has a capability of supporting that an internal connection is determined and controlled by a media gateway controller; and/or, has a capability of supporting that an internal connection is determined and controlled by the media gateway itself; and/or does not supporting an internal connection.

When it is determined by the media gateway controller that two parties of a call need to be connected internally, the media gateway adds, as instructed by the media gateway controller, two terminations representing respectively the two parties of the call into a same context, so that the two terminations are connected with each other directly.

When the internal connection is to be determined and controlled by the media gateway itself, as instructed by the media gateway controller, the media gateway creates one context for each party of the call, and adds a termination representing the calling party into the context created for the calling party, and adds a termination representing the called party into the context created for the called party. When determining the two parties of the call is to be connected internally, the media gateway connects the two terminations representing respectively the two parties of the call with each other;

When the media gateway does not support an internal connection, the media gateway controller does not need to determine and control an internal connection.

In various embodiments, according to service characteristics of each call, the media gateway controller determines and controls whether to allow the media gateway to implement an internal connection for the call by the media gateway itself.

The MGC acquires capability of the MG for supporting an internal connection through audit or configuration; and according to the obtained capability, the implementation of the internal connection is determined and controlled by the MGC or by the MG itself. Therefore, the MGC may implement adaptively an internal connection in different ways according to the capability of the MG, especially when the MGC and the MG are supplied from different equipment vendors and the MGC does not know the capability of the MG in advance. As long as the MG supports an internal connection, regardless of the way of supporting, the MGC may take full advantage of the internal connection, i.e., utilize the internal connection for any call for which the internal connection is required and may be implemented. This may guarantee and develop, to a greatest extent, the benefits from the reduction of codec conversion due to the internal connection.

If an internal connection is determined and implemented by the MG itself, the MG notifies the MGC to modify the call model at the MGC to be the same as that at the MG after implementing the internal connection, so that no complicated conversion between the two call models is required by the MG, thereby decreasing the processing complexity and overhead.

The MGC may instruct the MG to enable or disable the capability for determining and implementing an internal connection by the MG itself. This allows the MGC to enable or disable the capability for determining and implementing an internal connection by the MG itself flexibly based on characteristics of a service, so as to better meet demands of the service. For example, the capability for determining and implementing an internal connection by the MG itself need to be disabled in the case of a loop-back test.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

For better understanding of the objects, technical solutions and advantages, the present disclosure is described below in further detail with reference to the accompanying drawings.

In the present disclosure, for a service for which an internal connection may be implemented, the MGC acquires the capability of the MG with respect to whether an internal connection is supported through audit or configuration; and according to different capabilities of the MG, the internal connection is implemented for the service in different ways. Therefore, the MGC may implement adaptively an internal connection in different ways according to the capability of the MG, especially when the MGC and the MG are supplied from different equipment vendors and the MGC does not know the capability of the MG in advance. As long as the MG supports an internal connection, regardless of the way of supporting, the MGC may take full advantage of the internal connection, i.e., utilize the internal connection for any call for which the internal connection is required and may be implemented. This may develop, to the greatest extent, the benefits from the reduction of codec conversion due to the internal connection.

In particular, if an internal connection is to be determined and controlled by the media gateway controller, when determining two parties of a call can be connected internally, the media gateway controller instructs the media gateway to add two terminations representing respectively the two parties of the call into the same context, so that the two terminations are connected with each other directly. If the internal connection is to be determined and controlled by the media gateway itself, when determining the two parties of the call can be connected internally, the media gateway connects two terminations representing respectively the two parties of the call with each other directly in one context, or across two contexts.

Figure 1:
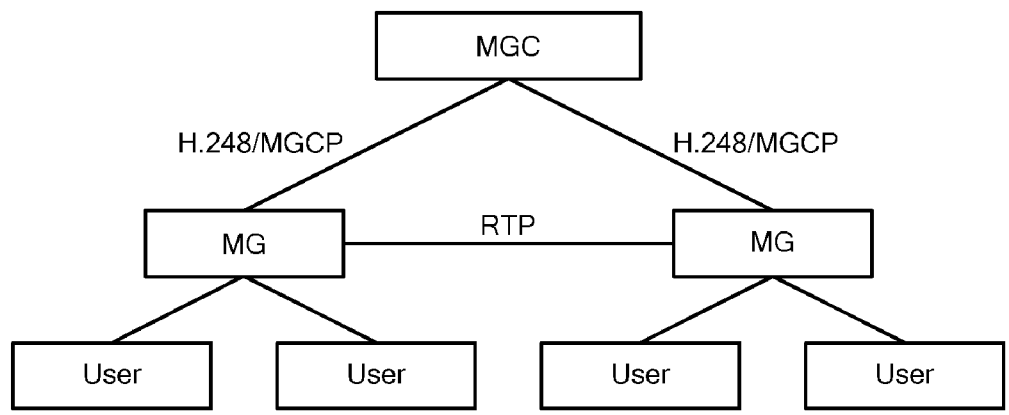
FIG. 1 is a schematic diagram illustrating the networking of an MGC and MGs in the prior art.
Figure 2:
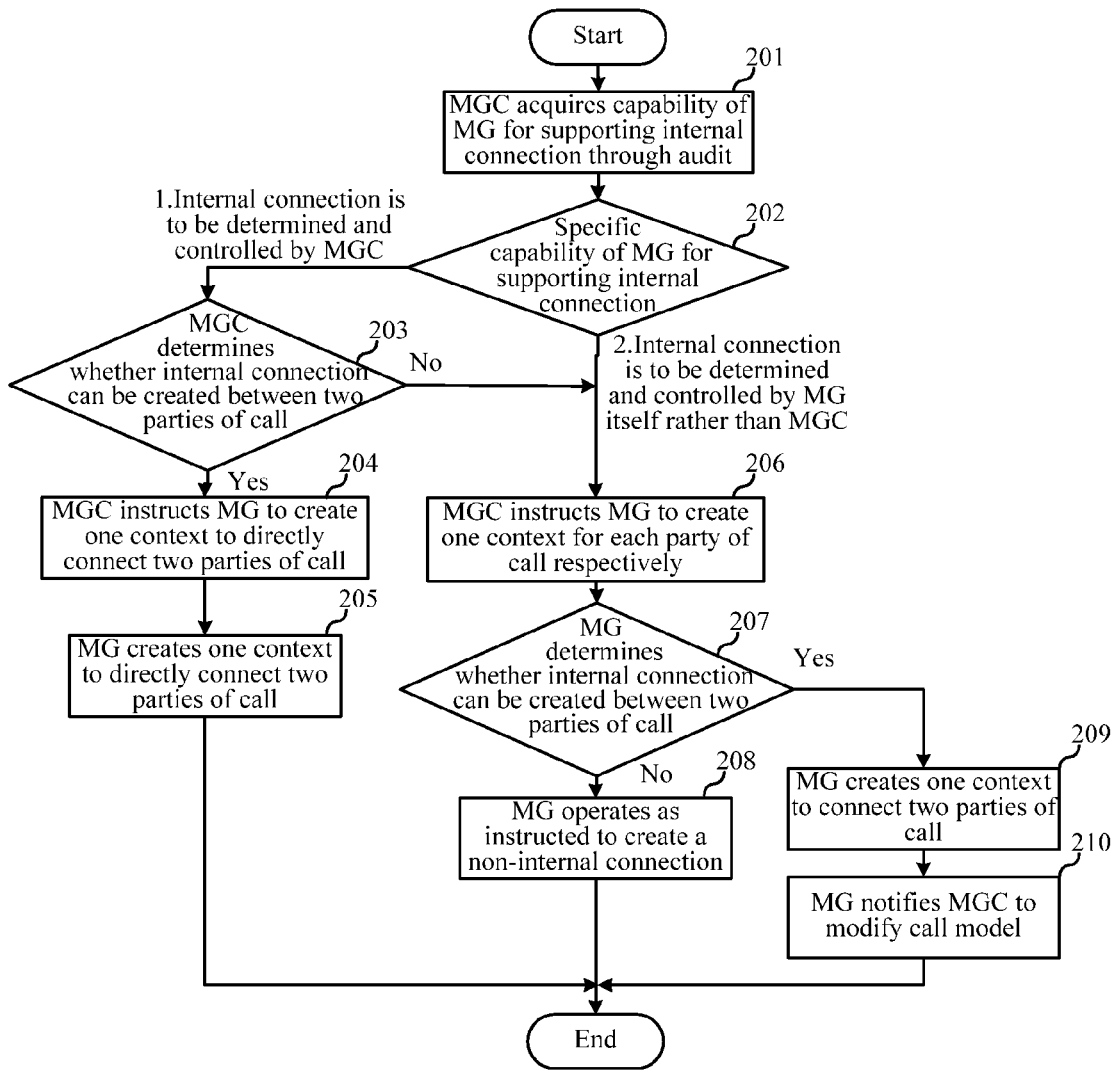
FIG. 2 is a flowchart illustrating a method for implementing an internal connection at an MG according to a first embodiment.

A method for implementing an internal connection at an MG according to a first embodiment shown in FIG. 2 includes the following.

201: The MGC acquires the capability of the MG for supporting an internal connection through auditing the MG. In other words, the MGC sends an audit request command regarding an internal connection capability to the MG, and the MG reports the capability of the MG for an internal connection in a corresponding audit reply command.

202: The MGC sends different instructions to the MG according to different capabilities of the MG for supporting an internal connection. The capability of the MG for supporting an internal connection includes: supporting that an internal connection is determined and controlled by the MGC; supporting that an internal connection is determined and controlled by the MG itself; and not supporting an internal connection.

In particular, if the capability of the MG lies in only supporting the determining and controlling of an internal connection by the MGC, the internal connection is to be determined and controlled by the MGC.

If the capability of the MG lies in only supporting the determining and controlling of an internal connection by the MG itself, it is optional that the internal connection is to be determined and controlled by the MGC or the MG itself.

If the capability of the MG lies in supporting the determining and controlling of an internal connection by both the MGC and the MG itself, it is optional that the internal connection is to be determined and controlled by the MGC or the MG itself.

If the capability of the MG lies in not supporting an internal connection, i.e., connecting two terminations both at the MG with each other is not supported by the MG, for example, when there is no internal logic for connecting two TDM channels, the MGC does not determine and control any internal connection.

When the capability of the MG includes supporting the determining and controlling of an internal connection by the MG itself, the MGC further determines and controls, according to service characteristics of each call, whether to allow the MG to implement an internal connection for the call by the MG itself. For example, the capability for determining and implementing an internal connection by the MG itself are disabled in the case of a loop-back test. In this case, the MGC sends an enable or disable instruction to the MG, so as to control whether an internal connection is to be determined and controlled by the MG itself. This allows the MGC to enable or disable the capability for determining and implementing an internal connection by the MG itself flexibly according to characteristics of a service, so as to better meet demands of the service.

If an internal connection is to be determined and controlled by the MGC finally, i.e., with the first condition is met, the process proceeds to 203. If an internal connection is to be determined and controlled by the MG itself rather than by MGC finally, i.e., with the second condition is met, the process proceeds to 206.

203: If the MGC determines that an internal connection can be created between two parties of a call, the process proceeds to 204; if the MGC determines that the internal connection cannot be created between the two parties of the call, the process also proceeds to 206.

204: The MGC instructs the MG to add two terminations representing respectively the two parties of the call into the same context, so that the two terminations are connected with each other directly. Then the process proceeds to 205.

205: The MG creates, as instructed by the MGC, one context to implement an internal connection between the two parties of the call, and then the process for implementing the internal connection ends.

206: The MGC instructs the MG to create one context for each party of the call. In a prior art approach, a termination representing the calling party is added into the context created for the calling party, and a termination representing the called party is added into the context created for the called party. Then the process proceeds to 207.

207: The MG determines whether an internal connection can be created between the two parties of the call. If the internal connection can be created between the two parties of the call, the process proceeds to 209. If the internal connection cannot be created between the two parties of the call the process turns to 208. For a call for which an internal connection cannot be created, which is determined by the MGC in 203, the MG gets the same result of determination. In this case, the process therefore also proceeds to 208.

208: The MG operates as instructed by the MGC according to a prior art approach, i.e., does not create an internal connection. Then the process for implementing the internal connection ends.

209: The MG creates only one context, and connects the two terminations representing respectively the two parties of the call with each other directly in the context. Then the process proceeds to 210.

210: The MG notifies the MGC to modify the call model to be the same as the actual call model at the MG, i.e., the two terminations representing respectively the two parties of the call are added into one context, and the MGC adapts the call model thereof according to synchronization information. Such a connection is referred to as an explicit connection. Then the process for implementing the internal connection ends.

After the call models at the MG and the MGC are synchronized, no complicated conversion between the two call models needs to be performed by the MG, thereby reducing the processing complexity and overhead.

Figure 3:
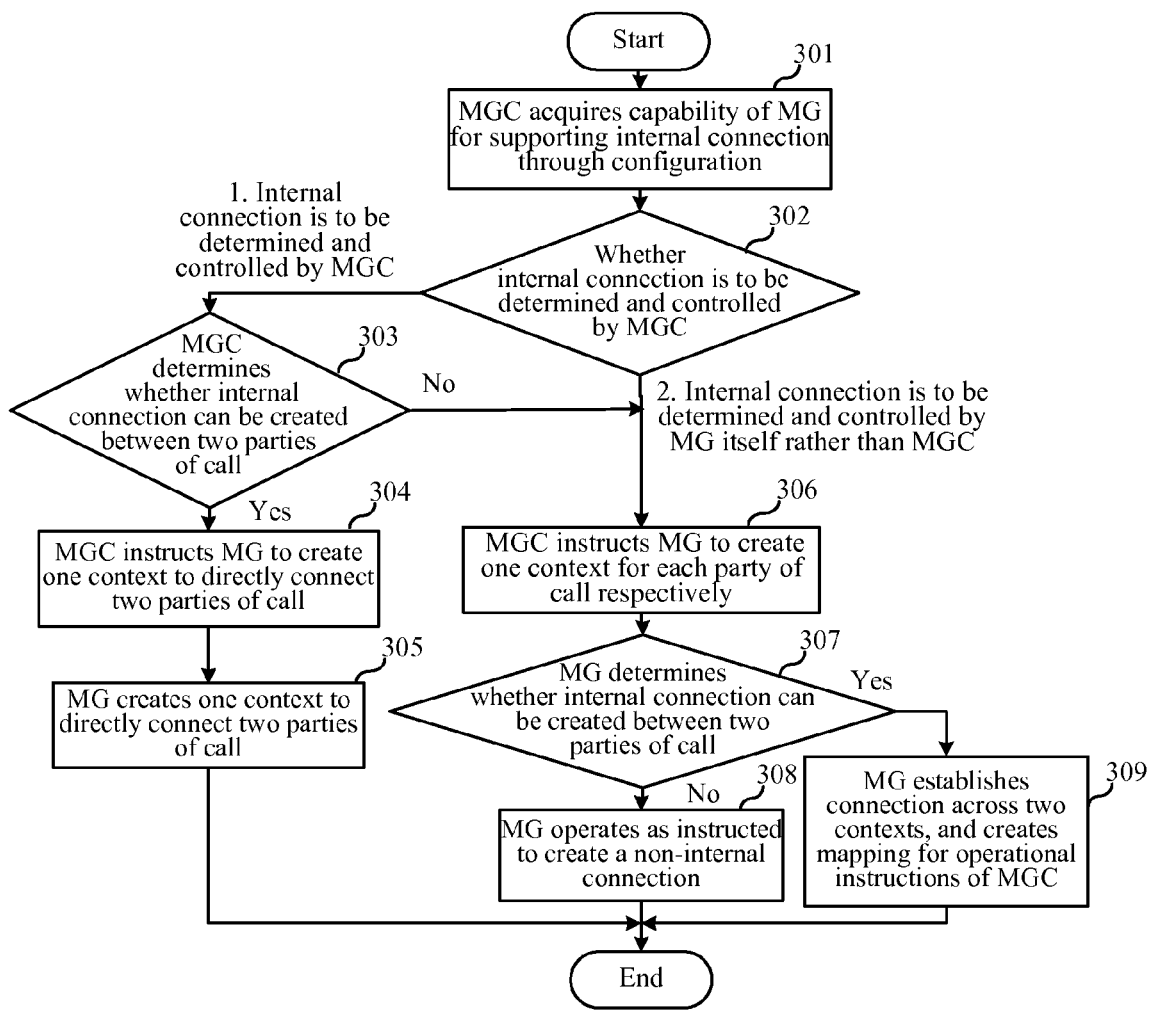
FIG. 3 is a flowchart illustrating a method for implementing an internal connection at an MG according to a second embodiment.

A method for implementing an internal connection at an MG according to a second embodiment shown in FIG. 3 includes the following.

301: The internal connection capability of each MG is configured at the MGC, so that the MGC may obtain the capability of a MG for supporting an internal connection. This configuration may be made statically in advance or dynamically through a maintaining interface.

302 to 308 are similar to 202 to 208 described above, and the description thereof is omitted here.

309: The MG creates one context for each party of the call as instructed by the MGC, and connects the two terminations representing respectively the two parties of the call with each other across the two contexts. The MG further creates a mapping between the operations performed by the MGC and the MG with respect to their respective call models. Then the process for implementing the internal connection ends.

Such a connection is referred to as an implicit connection, in which the call model of the MG is substantially the same as that of the MGC, and the two terminations representing respectively the two parties of the call are added into the two contexts respectively, while the MG connects the two terminations representing respectively the two parties of the call with each other by itself.

In the above embodiments, the interactions between the MGC and the MG are implemented through the media gateway control protocol, in which the capability of the MG for supporting an internal connection, and the enabling or disabling of the capability for implementing an internal connection by the MG itself, are defined via the extended property parameters in the media gateway control protocol.

A media gateway supporting an internal connection is provided according to another embodiment. The media gateway has a capability of supporting that an internal connection is determined and controlled by a media gateway controller; and/or, a capability of supporting that an internal connection is determined and controlled by the media gateway itself; and/or does not supporting an internal connection.

When it is determined by the media gateway controller that two parties of a call need to be connected internally, the media gateway adds, as instructed by the media gateway controller, two terminations representing respectively the two parties of the call into the same context, so that the two terminations are connected with each other directly.

When the internal connection is to be determined and controlled by the media gateway itself, as instructed by the media gateway controller, the media gateway creates one context for each party of the call, and adds a termination representing the calling party into the context created for the calling party, and adds a termination representing the called party into the context created for the called party. When determining the two parties of the call need to be connected internally, the media gateway connects the two terminations representing respectively the two parties of the call with each other;

When the media gateway does not support an internal connection, the media gateway controller does not need to determine and control an internal connection.

When determining that an internal connection needs to be created between the two parties of the call, the MG connects, as instructed by the MGC, the two terminations representing respectively the two parties of the call with each other directly in one context, and notifies the MGC to modify the call model thereof to be the same as the actual call model at the MG.

According to service characteristics of each call, the media gateway controller determines and controls whether to allow the media gateway to implement an internal connection for the call by the media gateway itself.

Although the present disclosure has been illustrated and described with reference to some preferred embodiments, it is to be understood by those ordinary skilled in the art that various changes in form and in detail can be made without departing from the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for implementing an internal connection at a media gateway, comprising the steps of:
   acquiring, by a media gateway controller, information on the capability of a media gateway for supporting an internal connection; and
   performing, by the media gateway controller, corresponding control according to the capability of the media gateway for supporting an internal connection,
   wherein the internal connection is a connection between two parties of a call at the same media gateway;
   wherein, the performing corresponding control according to the capability of the media gateway for supporting an internal connection comprises:
   when the internal connection is to be determined and controlled by the media gateway controller, and when the media gateway controller determines that the two parties of the call need to be connected internally, instructing, by the media gateway controller, the media gateway to add two terminations representing respectively the two parties of the call into a same context, so that the two terminations are connected with each other directly; and
   when the internal connection is to be determined and controlled by the media gateway itself, instructing, by the media gateway controller, the media gateway to create one context for each party of the call, and add a termination representing the calling party into the context created for the calling party, and add a termination representing the called party into the context created for the called party, so that the media gateway connects the two terminations representing respectively the two parties of the call with each other when the media gateway determines the two parties of the call need to be connected internally.

2. The method for implementing an internal connection at a media gateway according to claim 1, wherein the capability of the media gateway for supporting an internal connection comprises:
   supporting that an internal connection is determined and controlled by the media gateway controller;
   supporting that an internal connection is determined and controlled by the media gateway itself; and
   not supporting an internal connection.

3. The method for implementing an internal connection at a media gateway according to claim 2, wherein, if the capability of the media gateway lies in only supporting that an internal connection is determined and controlled by the media gateway controller, the internal connection is to be determined and controlled by the media gateway controller;
   if the capability of the media gateway lies in only supporting that an internal connection is determined and controlled by the media gateway itself, the internal connection is to be determined and controlled by the media gateway controller or the media gateway itself;
   if the capability of the media gateway lie in supporting that an internal connection is determined and controlled by both the media gateway controller and the media gateway itself, the internal connection is to be determined and controlled by the media gateway controller or the media gateway itself; and
   if the capability of the media gateway lie in not supporting an internal connection, no internal connection is necessary to be determined and controlled by the media gateway controller.

4. The method for implementing an internal connection at a media gateway according to claim 1, wherein, the media gateway controller acquires the information on the capability of the media gateway for supporting an internal connection through auditing the media gateway.

5. A computer program product, comprising computer program code, which, when executed by a computer unit, will cause the computer unit perform all step of claims 1.

6. The method for implementing an internal connection at a media gateway according to claim 1, wherein, the media gateway controller acquires the information on the capability of the media gateway for supporting an internal connection through configuration.

7. The method for implementing an internal connection at a media gateway according to claim 1, wherein, when determining that an internal connection needs to be created between the two parties of the call, the media gateway connects the two terminations representing respectively the two parties of the call with each other directly in one context, and notifies the media gateway controller to modify the call model thereof to be the same as the actual call model at the media gateway.

8. The method for implementing an internal connection at a media gateway according to claim 1, wherein, when determining an internal connection needs to be created between the two parties of the call, the media gateway connects the two terminations representing the two parties of the call with each other across the two contexts, and creates a mapping between operations performed by the media gateway controller and the media gateway with respect to their respective call models.

9. The method for implementing an internal connection at a media gateway according to claim 1, wherein, when the capability of the media gateway comprises supporting that an internal connection is determined and controlled by the media gateway itself, the media gateway controller determines and controls, according to a service characteristic of each call, whether to allow the media gateway to implement an internal connection for the call by the media gateway itself.

10. The method for implementing an internal connection at a media gateway according to claim 9, wherein the capability of the media gateway for supporting an internal connection, and/or the enabling or disabling of the capability of the media gateway for implementing an internal connection by the media gateway itself, are defined via extended property parameters in the media gateway control protocol.

11. A media gateway supporting an internal connection, comprising:
    means for providing information on the capability of the media gateway for supporting an internal connection to a media gateway controller;

means for adding two terminations representing respectively two parties of a call into a same context as instructed by a media gateway controller, when the media gateway controller determines that the two parties of the call need to be connected internally, so that the two terminations are connected with each other;

means for determining and controlling the internal connection;

means for creating one context for each party of the call as instructed by the media gateway controller, when the internal connection is determined and controlled by the media gateway itself;

means for adding a termination representing a calling party into a context created for the calling party;

means for adding another termination representing a called party into another context created for the called party; and means for connecting the two terminations representing respectively the two parties of the call with each other, when the two parties of the call is determined that needing to be connected internally.

12. The media gateway according to claim 11, further comprising:

means for notifying the media gateway controller to modify the call model thereof to be the same as the actual call model at the media gateway when the two terminations representing respectively the two parties of the call are connected with each other directly in one context.

13. A media gateway controller, comprising:

means for acquiring information on the capability of a media gateway for supporting an internal connection; and means for performing corresponding control according to the capability of the media gateway for supporting an internal connection, wherein the internal connection is a connection between two parties of a call at the same media gateway;

wherein, the performing corresponding control according to the capability of the media gateway for supporting an internal connection comprises:

when the internal connection is to be determined and controlled by the media gateway controller, and when the media gateway controller determines that the two parties of the call need to be connected internally, instructing, by the media gateway controller, the media gateway to add two terminations representing respectively the two parties of the call into a same context, so that the two terminations are connected with each other directly; and when the internal connection is to be determined and controlled by the media gateway itself, instructing, by the media gateway controller, the media gateway to create one context for each party of the call, and add a termination representing the calling party into the context created for the calling party, and add a termination representing the called party into the context created for the called party, so that the media gateway connects the two terminations representing respectively the two parties of the call with each other when the media gateway determines the two parties of the call need to be connected internally.

14. The media gateway controller according to claim 13, further comprising:

means for determining and controlling the internal connection.

15. A method for implementing an internal connection at a media gateway, comprising the steps of:

acquiring, by a media gateway controller, information on the capability of a media gateway for supporting an internal connection; and performing, by the media gateway controller, corresponding control according to the capability of the media gateway for supporting an internal connection, wherein the internal connection is a connection between two parties of a call at the same media gateway;

wherein the capability of the media gateway for supporting an internal connection comprises:

supporting that an internal connection is determined and controlled by the media gateway controller;

supporting that an internal connection is determined and controlled by the media gateway itself; and not supporting an internal connection;

wherein, if the capability of the media gateway lies in only supporting that an internal connection is determined and controlled by the media gateway controller, the internal connection is to be determined and controlled by the media gateway controller;

if the capability of the media gateway lies in only supporting that an internal connection is determined and controlled by the media gateway itself, the internal connection is to be determined and controlled by the media gateway controller or the media gateway itself;

if the capability of the media gateway lie in supporting that an internal connection is determined and controlled by both the media gateway controller and the media gateway itself, the internal connection is to be determined and controlled by the media gateway controller or the media gateway itself; and if the capability of the media gateway lie in not supporting an internal connection, no internal connection is necessary to be determined and controlled by the media gateway controller.

* * * * *